United States Patent
Buerger et al.

(10) Patent No.: US 8,103,565 B2
(45) Date of Patent: Jan. 24, 2012

(54) METHOD AND SYSTEM FOR ENABLING A LIFE INSURANCE PREMIUM LOAN

(75) Inventors: Alan H. Buerger, Wyndmoor, PA (US); Reid S. Buerger, Fort Washington, PA (US); Alex Seldin, Fort Washington, PA (US)

(73) Assignee: Coventry First LLC, Fort Washington, PA (US)

( * ) Notice: Subject to any disclaimer, the term of this patent is extended or adjusted under 35 U.S.C. 154(b) by 580 days.

(21) Appl. No.: 11/350,077

(22) Filed: Feb. 9, 2006

(65) Prior Publication Data

US 2006/0195392 A1   Aug. 31, 2006

Related U.S. Application Data

(60) Provisional application No. 60/651,617, filed on Feb. 10, 2005.

(51) Int. Cl.
*G06Q 40/00* (2006.01)
(52) U.S. Cl. .................. 705/35; 705/45; 705/38
(58) Field of Classification Search .................. None
See application file for complete search history.

(56) References Cited

U.S. PATENT DOCUMENTS

| | | | |
|---|---|---|---|
| 4,839,804 A * | 6/1989 | Roberts et al. .............. 705/36 R |
| 4,876,648 A | 10/1989 | Lloyd |
| 5,673,402 A | 9/1997 | Ryan |
| 5,752,236 A | 5/1998 | Sexton et al. |
| 5,907,828 A | 5/1999 | Meyer |
| 5,926,800 A | 7/1999 | Baronowski et al. |
| 6,119,093 A | 9/2000 | Walker |
| 6,134,536 A | 10/2000 | Shepherd |
| 6,304,859 B1 | 10/2001 | Ryan et al. |
| 6,393,405 B1 | 5/2002 | Vicente |
| 6,578,016 B1 | 6/2003 | Trankina et al. |
| 6,594,635 B1 | 7/2003 | Erlanger |
| 6,937,990 B1 | 8/2005 | Walker |
| 6,950,805 B2 | 9/2005 | Kavanaugh |
| 6,963,852 B2 | 11/2005 | Koresko |
| 7,158,950 B2 | 1/2007 | Snyder |
| 7,240,017 B2 | 7/2007 | Labelle et al. |
| 7,249,037 B2 | 7/2007 | Koppes et al. |
| 7,249,077 B2 | 7/2007 | Williams et al. |
| 7,324,950 B2 | 1/2008 | Sherman |
| 7,343,333 B2 | 3/2008 | Menke |

(Continued)

OTHER PUBLICATIONS

"The Next Generation Buy-Sell Agreement";Mollie Dive Stand 1st Floor, North Sydney Oval Function Centre Fig Tree Lane, off Miller Street North Sydney NSW 2060; May 18, 2005 www.lalawyers.com.au/docfiles/Paper_65.doc.*

(Continued)

*Primary Examiner* — Sarah Monfeldt
*Assistant Examiner* — Mary Gregg
(74) *Attorney, Agent, or Firm* — Dickstein Shapiro LLP

(57) ABSTRACT

A loan is secured by insurance policy collateral between a lender, borrower with the insurance policy, and an intermediary. The intermediary establishes a securities account and holds the insurance policy, which designates the borrower as the beneficial owner and the intermediary as the record owner. The lender disburses the loan proceeds to the borrower. In the event the lender notifies the intermediary of a default, the intermediary is obligated to modify the insurance policy by designating the lender as the beneficial owner of the policy, thereby enabling the lender to control the policy. The lender, for example, may make premium payments upon the policy, or order the intermediary to sell the policy.

33 Claims, 3 Drawing Sheets

U.S. PATENT DOCUMENTS

| | | | |
|---|---|---|---|
| 7,376,609 | B2 | 5/2008 | Clark |
| 2001/0034619 | A1 | 10/2001 | Sherman |
| 2001/0047325 | A1* | 11/2001 | Livingston ..................... 705/38 |
| 2002/0046067 | A1 | 4/2002 | Kraehenbuehl et al. |
| 2003/0023546 | A1 | 1/2003 | Shepherd |
| 2003/0074232 | A1 | 4/2003 | Lee |
| 2003/0083975 | A1 | 5/2003 | O'Grady et al. |
| 2003/0088444 | A1 | 5/2003 | Garbin et al. |
| 2003/0105690 | A1 | 6/2003 | Brown et al. |
| 2003/0105700 | A1 | 6/2003 | Brown et al. |
| 2003/0110061 | A1 | 6/2003 | Lakenbach et al. |
| 2003/0130935 | A1 | 7/2003 | Brown et al. |
| 2003/0130939 | A1* | 7/2003 | Brown et al. ..................... 705/39 |
| 2003/0187768 | A1* | 10/2003 | Ryan et al. ..................... 705/35 |
| 2004/0019506 | A1 | 1/2004 | Struchtemeyer et al. |
| 2004/0030589 | A1 | 2/2004 | Leisher et al. |
| 2004/0064391 | A1 | 4/2004 | Lange |
| 2004/0078242 | A1 | 4/2004 | Weiss et al. |
| 2004/0088201 | A1 | 5/2004 | Lang |
| 2004/0117289 | A1 | 6/2004 | McNealy et al. |
| 2004/0128233 | A1 | 7/2004 | Jarzmik |
| 2004/0148202 | A1 | 7/2004 | Siefe et al. |
| 2004/0167807 | A1 | 8/2004 | Fitzsimmons et al. |
| 2004/0176989 | A1 | 9/2004 | Darr |
| 2004/0177021 | A1 | 9/2004 | Carlson et al. |
| 2004/0181436 | A1 | 9/2004 | Lange |
| 2004/0236612 | A1 | 11/2004 | Heusinkveld et al. |
| 2004/0254878 | A1* | 12/2004 | Fitzsimmons et al. .......... 705/38 |
| 2004/0267647 | A1 | 12/2004 | Brisbois et al. |
| 2005/0010453 | A1 | 1/2005 | Terlizzi et al. |
| 2005/0033611 | A1 | 2/2005 | Phelps |
| 2005/0071205 | A1 | 3/2005 | Terlizzi et al. |
| 2005/0086085 | A1 | 4/2005 | Berlin et al. |
| 2005/0096945 | A1* | 5/2005 | Wharton ........................... 705/4 |
| 2005/0182670 | A1* | 8/2005 | Burgess ............................ 705/4 |
| 2005/0187869 | A1 | 8/2005 | Bierger |
| 2005/0192849 | A1 | 9/2005 | Spalding, Jr. |
| 2005/0203822 | A1 | 9/2005 | Shea et al. |
| 2005/0216316 | A1* | 9/2005 | Brisbois et al. ................... 705/4 |
| 2005/0222941 | A1 | 10/2005 | Tull, Jr. |
| 2005/0234747 | A1 | 10/2005 | Kavanaugh |
| 2005/0234791 | A1* | 10/2005 | Krasnerman ................... 705/35 |
| 2005/0240449 | A1 | 10/2005 | Gore et al. |
| 2005/0288969 | A1 | 12/2005 | Schuver et al. |
| 2005/0289049 | A1 | 12/2005 | Schuver et al. |
| 2006/0031151 | A1 | 2/2006 | Dorr |
| 2006/0041455 | A1 | 2/2006 | Dehais |
| 2006/0059020 | A1 | 3/2006 | Davidson |
| 2006/0064331 | A1 | 3/2006 | Odermott et al. |
| 2006/0080148 | A1 | 4/2006 | Koresko |
| 2006/0100913 | A1 | 5/2006 | Ward |
| 2006/0111949 | A1 | 5/2006 | Krasnerman |
| 2006/0122871 | A1 | 6/2006 | Cowley |
| 2006/0136313 | A1 | 6/2006 | Driver |
| 2006/0136316 | A1 | 6/2006 | Shiau |
| 2006/0143055 | A1 | 6/2006 | Loy |
| 2006/0143099 | A1 | 6/2006 | Partlow |
| 2006/0143113 | A1 | 6/2006 | Bercovitz |
| 2006/0143114 | A1 | 6/2006 | Schuver |
| 2006/0143115 | A1 | 6/2006 | Eder |
| 2006/0155588 | A1 | 7/2006 | Kilbar et al. |
| 2006/0155621 | A1 | 7/2006 | Bell |
| 2006/0178979 | A1 | 8/2006 | Levine |
| 2006/0184442 | A1 | 8/2006 | Krasnerman |
| 2006/0190395 | A1 | 8/2006 | Solomon |
| 2006/0200406 | A1 | 9/2006 | Burke |
| 2006/0206415 | A1 | 9/2006 | Ross |
| 2006/0206417 | A1 | 9/2006 | Selby |
| 2006/0206438 | A1 | 9/2006 | Sakaue |
| 2006/0287893 | A1 | 12/2006 | Weiss et al. |
| 2006/0287949 | A1 | 12/2006 | Silverman |
| 2007/0011064 | A1 | 1/2007 | Edwards |
| 2007/0016455 | A1 | 1/2007 | Ryan |
| 2007/0016516 | A1 | 1/2007 | Mountford |
| 2007/0022034 | A1 | 1/2007 | Lenhard |
| 2007/0033119 | A1 | 2/2007 | Dubitsky et al. |
| 2007/0050217 | A1 | 3/2007 | Holden |
| 2007/0055617 | A1 | 3/2007 | Garcia et al. |
| 2007/0055620 | A1 | 3/2007 | Garcia et al. |
| 2007/0094053 | A1 | 4/2007 | Samuels |
| 2007/0094054 | A1 | 4/2007 | Crabb |
| 2007/0094125 | A1 | 4/2007 | Izyayev |
| 2007/0094127 | A1 | 4/2007 | Izyayev |
| 2007/0100727 | A1 | 5/2007 | Multer et al. |
| 2007/0106589 | A1 | 5/2007 | Schirripa |
| 2007/0118393 | A1 | 5/2007 | Rosen et al. |
| 2007/0129972 | A1 | 6/2007 | Labelle et al. |
| 2007/0130035 | A1 | 6/2007 | Carden |
| 2007/0136164 | A1 | 6/2007 | Roti et al. |
| 2007/0150318 | A1 | 6/2007 | Pickard et al. |
| 2007/0156558 | A1 | 7/2007 | Wolzenski et al. |
| 2007/0156559 | A1 | 7/2007 | Wolzenski et al. |
| 2007/0162380 | A1 | 7/2007 | Conroy |
| 2007/0168268 | A1 | 7/2007 | Lange |
| 2007/0185741 | A1 | 8/2007 | Hebron |
| 2007/0214071 | A1 | 9/2007 | Stone |
| 2007/0214072 | A1 | 9/2007 | Stone |
| 2007/0226015 | A1 | 9/2007 | Lutnick |
| 2007/0226123 | A1 | 9/2007 | Lutnick |
| 2007/0239583 | A1 | 10/2007 | Williams |
| 2007/0250353 | A1 | 10/2007 | Schwartz |
| 2007/0250427 | A1 | 10/2007 | Robinson |
| 2007/0288262 | A1 | 12/2007 | Sakaue |
| 2007/0299760 | A1 | 12/2007 | Lange |
| 2008/0040166 | A1 | 2/2008 | Foti |
| 2008/0071584 | A1 | 3/2008 | Parankirinathan |
| 2008/0082371 | A1 | 4/2008 | Phillips |
| 2008/0091594 | A1 | 4/2008 | Abramson |
| 2008/0097797 | A1 | 4/2008 | Morris |
| 2008/0103840 | A1 | 5/2008 | Luedtke |
| 2008/0126138 | A1 | 5/2008 | Cherney |
| 2008/0133279 | A1 | 6/2008 | Pollock |
| 2008/0147447 | A1 | 6/2008 | Roche |
| 2008/0167903 | A1 | 7/2008 | Hall |
| 2008/0167904 | A1 | 7/2008 | Rudich |
| 2008/0168000 | A1 | 7/2008 | Dunn |
| 2008/0172260 | A1 | 7/2008 | Thacker |
| 2008/0172325 | A1 | 7/2008 | Lange |
| 2008/0177582 | A1 | 7/2008 | O'Brien |
| 2008/0183507 | A1 | 7/2008 | Lutnick |
| 2008/0183510 | A1 | 7/2008 | Pollock |
| 2008/0183636 | A1 | 7/2008 | Walsh |

OTHER PUBLICATIONS

"Trust owned Life Insurand: is It an Accident Waiting to Happen" by Mark A Teitelbaum at web.archive.org/web/20041101065259/http://efmoody.com/estate/trustowned.html.*

"Life Insurance and Life Annuities Backed Charitable Securities", Series A Investor Certificates, UBS Investment Bank, Apr. 2004.

Strom, Stephanie, "Charities Look to Benefit from a New York Twist on Life Insurance", The New York Times, Jun. 5, 2004.

Provada Insurance Services, Inc., "Life Insurance Premium Financing," Client Guide.

Provada Insurance Services, Inc., "Premium Financing," Client Profile, 2004, pp. 1-2.

Provada Insurance Services, Inc., "Premium Financing," Sales Strategy, 2004, pp. 1-3.

* cited by examiner

METHOD AND SYSTEM FOR ENABLING A LIFE INSURANCE PREMIUM LOAN

This application claims priority to provisional application No. 60/651,617, filed on Feb. 10, 2005, which is hereby incorporated by reference in its entirety.

FIELD OF INVENTION

The present invention relates to a method and apparatus for securing loans which hold as collateral against default one or more life insurance policies.

BACKGROUND OF THE INVENTION

A secured loan is a type of security interest which arises when a lender and borrower agree in a security agreement that the lender, as the secured party, may take specific collateral owned by the borrower if the borrower defaults on the loan.

Typically, the collateral is personal property; for example, the collateral can be an automobile in the case of a car loan, or real property, as in the case of a house for a mortgage. When the collateral is either personal or real property, there are a variety of mechanisms which permit a borrower to resolve its priority in the collateral with respect to secured and unsecured creditors to gain value from and title to the collateral in an efficient, reliable, and timely manner. Generally, this is sufficient for the lender to loan monies to the borrower.

At times it is desirable for a lender and a borrower to secure a loan based upon an life insurance policy of the borrower. The security agreement for this type of loan is typically a collateral assignment recorded on the books of the insurance carrier that issued the life insurance policy. Such a recordation may permit the secured party to obtain title to the life insurance policy should the borrower default on the loan. For example, the collateral assignment would permit the secured party to obtain title to the policy over any unsecured creditor. However, the secured party's rights to the policy over other secured creditors of the lender is less certain, and frequently varies from state to state.

Additionally, due to the nature of life insurance, the fact that the secured party can obtain title to the insurance policy after a default may not be sufficient. For example, the value of the insurance policy may be contingent upon the payment of a premium. If the borrower, as the insured party, also fails to make premium payments, the insurance policy may be terminated by the insurance company, thereby destroying the value of the collateral. This level of risk may be unacceptable to lenders, thereby making it difficult to use an insurance policy as collateral for a loan.

Accordingly, there is a need and desire for a system and method for securing loans with one or more insurance policies.

SUMMARY OF THE INVENTION

Exemplary embodiments of the present invention provide for a method and system for securing a loan between a lender and a borrower using an insurance policy as collateral through the use of an intermediary. The insurance policy is tendered by the borrower to the intermediary, which becomes the nominal record owner of the policy, but administers the policy pursuant to an agreement entered into between the lender, borrower, and the intermediary. The agreement designates the borrower as the beneficial owner of the policy, but permits the lender to obtain beneficial ownership upon notice of a default of the loan between the lender and the borrower to the intermediary. Thus, as long as the borrower is not in default, the borrower is entitled to all the rights associated with the insurance policy. Upon default, the lender can direct the policy intermediary to act consistently with the lender's obligation to the borrower including obtaining beneficial ownership of the policy. For example, the lender makes premium payments, or sell the insurance policy.

BRIEF DESCRIPTION OF THE DRAWINGS

The foregoing and other advantages and features of the invention will become more apparent from the detailed description of the exemplary embodiments of the invention given below with reference to the accompanying drawings, in which.

DETAILED DESCRIPTION OF THE INVENTION

Figure 1:
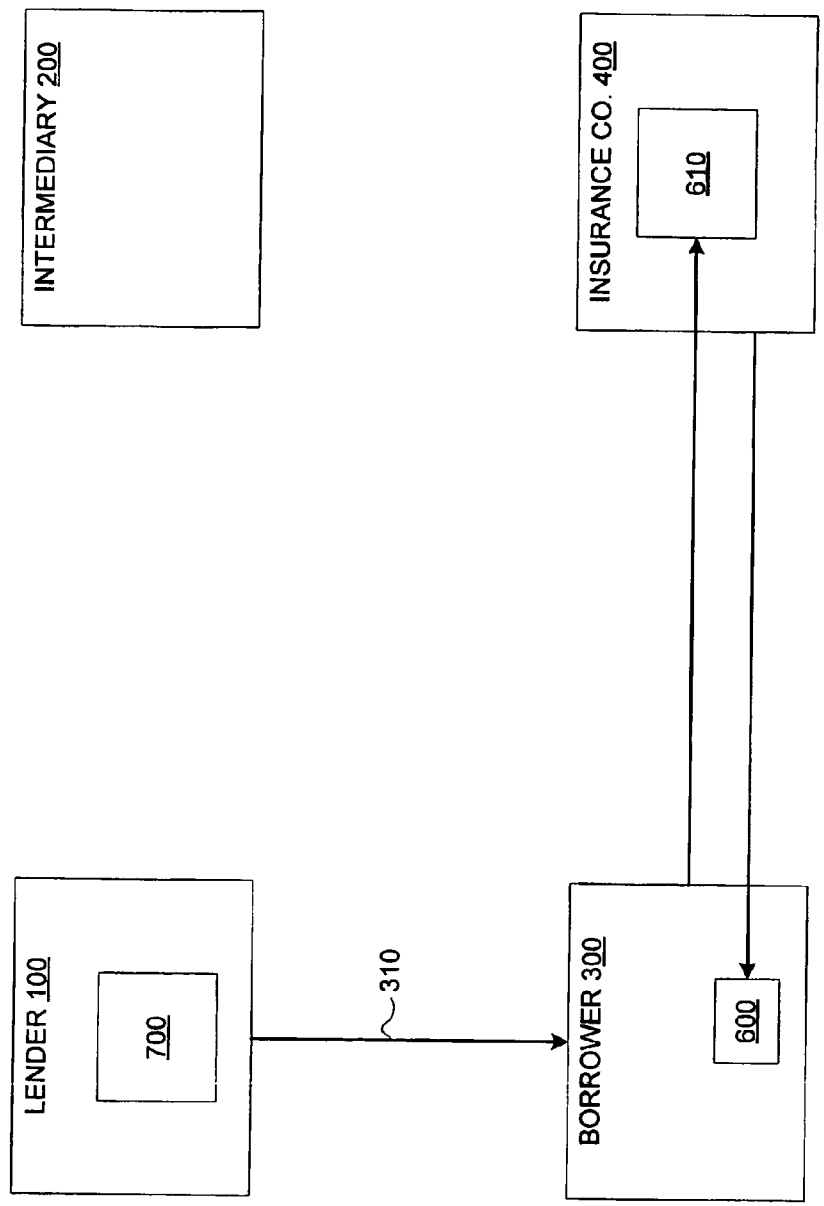
FIG. 1 is an illustration of parties required to practice the invention according to an exemplary embodiment of the invention.

Now referring to the drawings, where like reference numerals designate like elements, there is an exemplary embodiment of the invention shown in FIG. 1 illustrating a borrower 300 which has purchased an insurance policy 600 by paying an insurance company 400 a premium 610. In a preferred embodiment, the insurance policy 600 is a life insurance policy which names the borrower 300 as both the record owner and the beneficial owner. Accordingly, the borrower 300 is responsible for making periodic premium payments 610 to the insurance company 400 in order to maintain the insurance policy 600. The borrower 300 is also entitled to any benefit conferred by the insurance policy 600. In another aspect of the invention, other types of assets can be used in place of the insurance policy. For example, a paid-up life insurance policy can be used in place of a life insurance policy that has outstanding premium payments. Furthermore, although described with reference to a single insurance policy, the invention is not so limited and can utilize more than one insurance policy for use as collateral.

According to FIG. 1, the lender 100 wants to lend the borrower 300 funds 700 designated by line 310 and secure the loan transaction using an insurance policy 600 as collateral for the loan 700. An intermediary 200 (discussed below) is also shown in FIG. 1.

Figure 2:
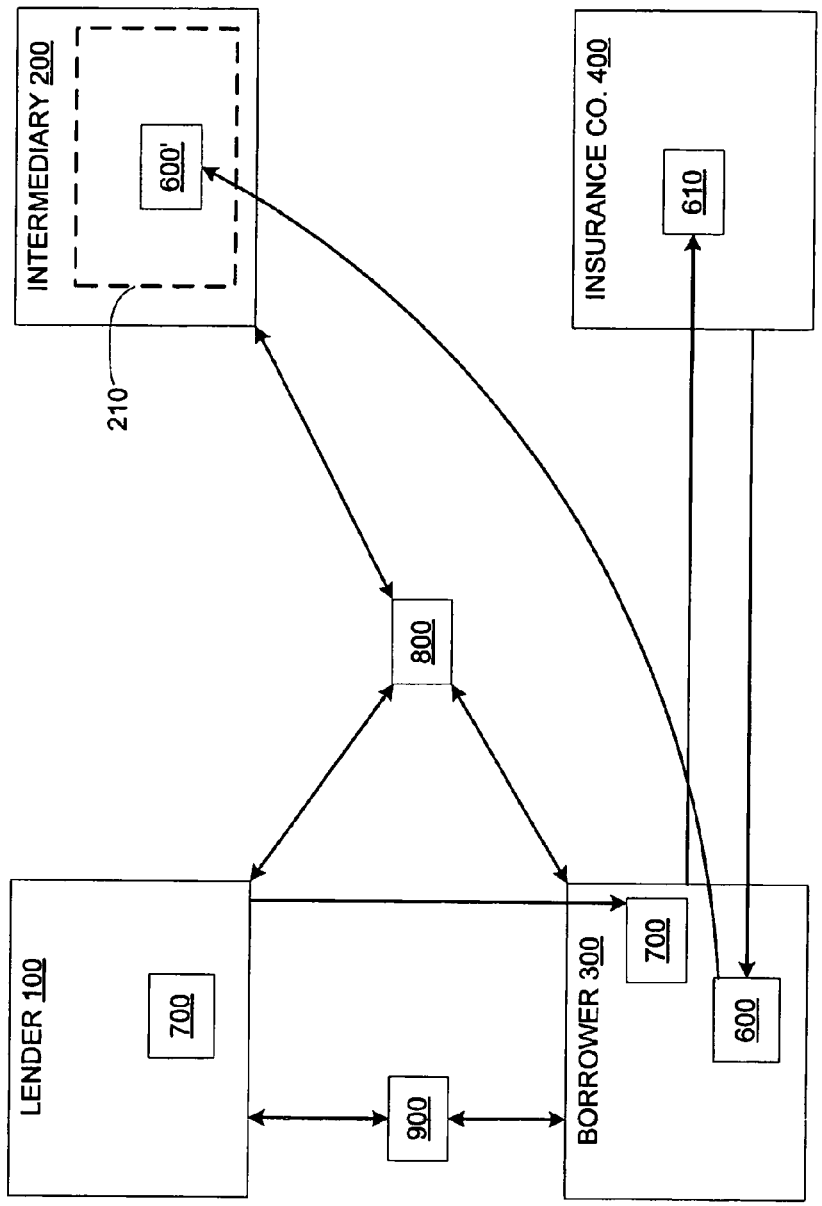
FIG. 2 is an illustration of a loan structured in accordance with the principles of the present invention according to an exemplary embodiment of the invention.

FIG. 2 illustrates a loan transaction structured according to an exemplary embodiment of the principles of the present invention. The lender 100, intermediary 200, and the borrower 300 enter into a three-way loan collateralization or security agreement 800. The lender 100 and the borrower 300 also enter into a loan agreement 900. Although the loan agreement 900 is illustrated as a separate agreement from the security agreement 800, the invention may also be practiced by incorporating the loan agreement 900 within the security agreement 800. An exemplary agreement 800 is shown in Appendix A.

With respect to the lender 100, the security agreement 800 requires the lender to disburse the funds 700 to the borrower 300. With respect to the intermediary 200, the security agreement 800 requires the intermediary 200 to create a securities account 210. The original insurance policy 600 is modified, and the modified insurance policy 600' is held in the securities account 210. The intermediary 200 is further required to manage the securities account 210 as described in greater detail below. In another aspect of the invention, the intermediary 200 holds the life insurance policy 600' in something other than a securities account, for example, the policy can be kept in the intermediary's safe deposit box.

With respect to the borrower 300, the borrower 300 agrees, in exchange to receiving funds 700, to repay the funds 700 in full plus an amount of interest, and to modify the insurance policy 600 into insurance policy 600' to be held at the intermediary 200, such that in the modified insurance policy 600' the intermediary 200 becomes the record owner while the borrower 300 remains as the beneficial owner.

The security agreement 800 further permits, upon a notification of a default of the borrower 300 by the lender 100, the intermediary 200 to modify the insurance policy 600' to change the beneficial owner of the policy 600' to the lender 100 and require the intermediary 200 to follow the instructions of the lender 100. Additionally, the lender 100 may instruct the intermediary 200 to have the policy 600' reflect the lender 100 as the record owner of the policy 600'. For example, if the borrower 300 defaults on the loan, upon notification of the default to the intermediary 200, the lender 100 becomes the beneficial owner of the policy 600'. In its capacity as the beneficial owner of the policy 600', the lender 100 can make premium payments 610 to the insurance company 400 in order to maintain the policy 600' (not illustrated). Alternatively, the lender 100 can instruct the intermediary 200 to sell the policy 600' (not illustrated).

In another aspect, the security agreement 800 additionally permits, upon a notification of a satisfaction of the borrower's loan to the lender 100, the intermediary 200 to follow the instructions of the borrower 300. For example, the borrower 300 may require the intermediary 200 to modify the insurance policy 600' to change the record owner of the policy 600' to the borrower 300. Additionally, the borrower 300 may require the intermediary 200 to sell the policy 600'.

Although FIGS. 1-2 illustrate the lender 100 and the intermediary 200 as different parties, the invention may also be practiced if the lender 100 and the intermediary 200 are the same party.

Figure 3:
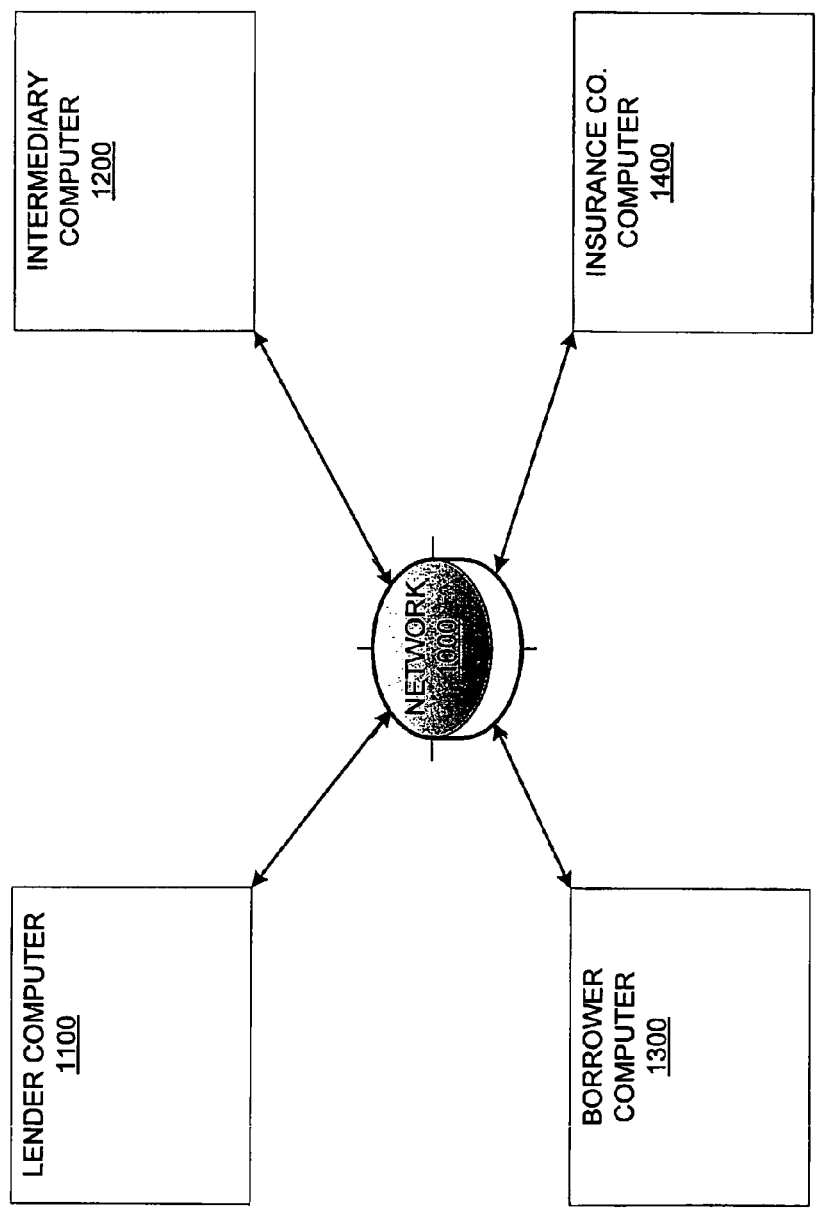
FIG. 3 is an illustration of a computer network which may be used to implement the present invention according to an exemplary embodiment of the invention.

FIG. 3 illustrates that in a preferred embodiment, computers 1100, 1200, 1300, and 1400, respectively used by the lender 100, intermediary 200, borrower 300, and insurance company 400 may each be coupled to a network 1000. The network 1000 may be, for example, the Internet or any other wide area or even local area network. A portion of the network 1000, for example, between the lender computer 1100 and the intermediary computer 1200, may be a local area network, while another portion of the network 1000 (or the entire network) may be part of the Internet. Each party in FIGS. 1-2 can use their respective computers 1100, 1200, 1300, and 1400 to determine whether the conditions of the security agreement 800 have been complied with before performing their obligations under the security agreement 800. Additionally, in another aspect of the invention, the computers 1100, 1200, 1300, and 1400 are used to implement additional features. For example, an additional feature includes the computers 1100, 1200, 1300, 1400 communicating messages to set up the three-way security agreement 800 and the loan agreement 900 sending and processing instructions to disburse funds in accordance with agreements 800, 900, and sending and processing instructions to modify the insurance policy 600 into the modified insurance policy 600'. The computers 110, 1200, 1300, and 1400 may include at least one world wide web server for supporting one or more web based applications for performing the above described tasks. The web based application(s) may be accessible on one or more intranets. The web based application(s) may also be accessible over the global Internet.

It is well known in the art that computers 1100, 1200, 1300 and 1400 can possess at least central processing unit that interprets and executes instructions; input devices, such as a keyboard and a mouse, through which data and commands enter the computer; memory that enables the computer to store programs and data; and output devices, such as printers and display screens, that show the results after the computer has processed data, (Source: The American Heritage® Science Dictionary Copyright, ©2002 by Houghton Mifflin Company).

While the invention has been described in detail in connection with the exemplary embodiments, it should be understood that the invention is not limited to the above disclosed embodiments. Rather, the invention can be modified to incorporate any number of variations, alternations, substitutions, or equivalent arrangements not heretofore described, but which are commensurate with the spirit and scope of the invention. Accordingly, the invention is not limited by the foregoing description or drawings, but is only limited by the scope of the appended claims.

What is claimed as new and desired to be protected by Letters Patent of the United States is:

1. A computer-implemented method for securing a loan, made between a lender and a borrower, with a life insurance policy, pursuant to a first agreement between said lender, said borrower, and an intermediary, the method comprising the steps of: modifying by the borrower as record owner of the insurance policy, the insurance policy to name the intermediary as record owner of the insurance policy, where the intermediary and the lender are different parties; holding, by the intermediary, said insurance policy as a financial asset, in a security account and storing data relating to the insurance policy in a memory reflecting the naming of the intermediary as record owner of the insurance policy; and disbursing, by the lender, the loan to said borrower in accordance with a loan agreement; wherein said first agreement permits said lender to become the record owner of the insurance policy when said borrower is in default of said loan agreement, when a notification of default is received, the data relating to the insurance policy stored in the memory is modified to name the lender as both the record and beneficial owner of the insurance policy.

2. The computer-implemented method of claim 1, further including maintaining the borrower as beneficial owner of the insurance policy when the insurance policy is modified to name the intermediary as record owner.

3. A method for securing a loan, made between a lender and a borrower, with an insurance policy, the method comprising the steps of:

purchasing, by a borrower, an insurance policy;

using, by the borrower, the insurance policy as collateral for a loan agreement;

entering, by the borrower, into the loan agreement with a lender;

entering, by the borrower, into a loan collateral agreement with the lender and an intermediary, where the intermediary and the lender are different parties; and using a processor to:

electronically modify, pursuant to the loan collateral agreement, data relating to the insurance policy to name the intermediary as record owner of the insurance policy; and electronically modify, in an event of notification of a default of the loan agreement, the data relating to the insurance policy to name the lender as the beneficial owner of the insurance policy.

4. The method of claim 3, wherein said loan agreement is part of said loan collateral agreement.

5. The method of claim 3, further comprising the step of: modifying, in the event of notification of a default of the loan agreement, the insurance policy to name the lender as the record owner of the insurance policy.

6. The method of claim 5, further comprising the step of: naming, in the event of notification of a satisfaction of the loan agreement, the borrower as the record owner of the insurance policy.

7. The method of claim 5, further comprising the steps of: instructing, in the event of notification of a satisfaction of the loan agreement, the intermediary to sell the insurance policy; and providing the proceeds of the sale to the borrower.

8. The method of claim 3, further comprising the steps of: instructing, in the event of notification of a default of the loan agreement, the intermediary to sell the insurance policy; and providing the proceeds of the sale to the lender.

9. The method of claim 3, further comprising the step of: paying, by the borrower, premiums on the insurance policy.

10. The method of claim 9, further comprising the step of: paying, by the lender in the event of notification of a default of the loan agreement, premiums on the insurance policy.

11. The method of claim 3, further including maintaining the borrower as beneficial owner of the insurance policy when the insurance policy is modified to name the intermediary as record owner.

12. A computer system for operation by an intermediary managing an insurance policy pledged as collateral against a loan between a lender and a borrower, the computer system comprising: an input device adapted to receive data relating to the insurance policy from the borrower; a memory adapted to store the data relating to the insurance policy; and at least one central processing unit connected to the memory and input device, the at least one central processing unit being adapted to modify the insurance policy to name the intermediary as record owner of the insurance policy, wherein: the input device is further adapted to, when notification of default is received, the data relating to the insurance policy stored in the memory is modified to name the lender as beneficial owner of the insurance policy.

13. The computer system of claim 12, wherein the central processing unit is further adapted to, on receipt of a notification of satisfaction of the loan from the lender, rename the borrower as record owner of the insurance policy.

14. The computer system of claim 12, wherein the central processing unit is further adapted to, on receipt of a notification of satisfaction of the loan from the lender, use an output device to electronically sell the insurance policy and to provide the proceeds of the sale to the borrower.

15. The computer system of claim 12, wherein the at least one central processing unit is further adapted to, on receipt of a notification of default of the loan from the lender, use an output device to electronically sell the insurance policy and to provide the proceeds of the sale to the lender.

16. The system of claim 12, wherein the at least one central processing unit is further adapted to maintaining the borrower as beneficial owner of the insurance policy when modifying the insurance policy to name the intermediary as record owner of the insurance policy.

17. A computer system for facilitating securing, by lenders, loans made with borrowers having an insurance policy, the system comprising:
an input device for receiving data comprising an insurance policy owned by a borrower;
at least one central processing unit connected to the input device, the at least one central processing unit being adapted to implement a loan agreement between a lender and the borrower, the insurance policy being used as collateral for the loan agreement;
the at least one central processing unit being further adapted to implement a security agreement between the lender, the borrower, and an intermediary, wherein pursuant to the security agreement, the insurance policy is modified to name intermediary as record owner;
the at least one central processing unit being further adapted to, when notification of default is received, modify the data relating to the insurance policy stored in the memory to name the lender as beneficial owner of the insurance policy.

18. The system of claim 17, wherein the at least one central processing unit is further operable to name lender as record owner in an event of a notification of a default of the loan agreement by the borrower.

19. The system of claim 17, wherein the at least one central processing unit is further adapted to, upon completion of implementation of the security agreement, transmit the insurance policy to the intermediary.

20. The system of claim 19, wherein the at least one central processing unit is further operable to instruct the intermediary to sell the insurance policy and to provide the proceeds of the sale to the borrower in an event of notification of a satisfaction of the loan agreement by the borrower.

21. The system of claim 19, wherein the at least one central processing unit is further operable to instruct the intermediary to sell the insurance policy in an event of notification of a default of the loan agreement by the borrower and to provide the proceeds of the sale to the lender.

22. The system of claim 17, wherein the at least one central processing unit is further operable to transmit premiums to an issuer of the insurance policy in an event of notification of a default of the loan agreement by the borrower.

23. The system of claim 17, wherein the at least one central processing unit is further operable to instruct the intermediary to name the borrower as record owner of the insurance policy in an event of notification of a satisfaction of the loan agreement by the borrower.

24. The system of claim 17, wherein modifying the insurance policy comprises sending instructions to an issuer of the insurance policy.

25. A computer-implemented method for managing, by an intermediary, an insurance policy pledged as collateral against a loan between a lender and a borrower, the method comprising: electronically receiving and storing data, in a memory, relating to the insurance policy from the borrower; modifying, using at least one central processing unit connected to the memory, the data relating to the insurance policy to a name the intermediary as record owner of the insurance policy; electronically receiving a notification from the lender including a message that the loan is in default or has been satisfied as to a status of the loan; and modifying, using the at least one central processing unit, the data relating to the insurance policy based on contents of the notification, when the notification comprises a message that the loan is in default, the data relating to the insurance policy is modified to name lender as beneficial owner.

26. The method of claim 25, further comprising notifying the lender of completion of the modification.

27. The method of claim 25, wherein: when the notification comprises a message that the loan is in defaults; the data relating to the insurance policy is further modified to name lender as record owner.

28. The method of claim 25, wherein: when the notification comprises a message the loan has been satisfied; the data relating to the insurance policy is further modified to name borrower as record owner.

29. The method of claim 25, wherein: when the notification comprises a message that the loan is in default; said modifying comprises: electronically arranging to sell the insurance policy; and providing the proceeds of the sale to the lender.

30. The method of claim 25, wherein: when the notification comprises a message that the loan is in defaults; said modifying comprises electronically transmitting premiums to an issuer of the insurance policy to keep the insurance policy in force.

31. The method of claim 25, wherein the modifying is effected by sending instructions to an issuer of the insurance policy.

32. A computer system for operation by an intermediary managing an insurance policy pledged as collateral against a loan between a lender and a borrower, the system comprising: an input device for receiving data including an insurance policy owned by a borrower; at least one central processing unit connected to the input device, the at least one central processing unit being adapted to modify the insurance policy to name the intermediary as record owner of the insurance policy while maintaining the borrower as beneficial owner of the insurance policy the at least one central processing unit being further adapted to receive notifications from the lender relating to a default or a satisfaction of the loan; and the at least one central processing unit being further adapted to, on receipt of a notification of a default of the loan from the lender, the data relating to the insurance policy stored in the memory is modified to name the lender as beneficial owner of the insurance policy.

33. The system of claim 32, wherein modifying the insurance policy comprises sending instructions to an issuer of the insurance policy.

* * * * *